(12) United States Patent
Laberge et al.

(10) Patent No.: US 11,521,643 B2
(45) Date of Patent: Dec. 6, 2022

(54) WEARABLE AUDIO DEVICE WITH USER OWN-VOICE RECORDING

(71) Applicant: Bose Corporation, Framingham, MA (US)

(72) Inventors: Francois Laberge, Framingham, MA (US); Kevin Paul Annunziato, Medway, MA (US)

(73) Assignee: Bose Corporation, Framingham, MA (US)

( * ) Notice: Subject to any disclaimer, the term of this patent is extended or adjusted under 35 U.S.C. 154(b) by 277 days.

(21) Appl. No.: 16/869,759

(22) Filed: May 8, 2020

(65) Prior Publication Data

US 2021/0350821 A1    Nov. 11, 2021

(51) Int. Cl.
*G10L 25/78*     (2013.01)
*G06N 20/00*     (2019.01)
(Continued)

(52) U.S. Cl.
CPC ............... *G10L 25/78* (2013.01); *G06N 5/04* (2013.01); *G06N 20/00* (2019.01); *G10L 15/22* (2013.01);
(Continued)

(58) Field of Classification Search
CPC ..... G02C 11/10; G06F 3/0484; G06F 3/0487; G06F 3/165; G06F 11/3692; G06F 3/167; G06F 9/451; G06F 3/04883; G06N 5/04; G06N 20/00; G10L 15/14; G10L 15/22; G10L 19/018; G10L 21/0272; G10L 25/21; G10L 25/78; G10L 25/84; G10L 2015/223; G10L 15/30; G10L 17/00; G10L 25/18; G10L 25/22; G10L 25/87; G11B 27/005; H04M 1/6033; H04M 1/6066; H04M 1/656; H04M 3/2236; H04M 3/2281; H04M 9/082; H04M 1/05; H04M 1/6058; H04M 3/493; H04M 3/533; H04M 3/53383;
(Continued)

(56) References Cited

U.S. PATENT DOCUMENTS 4,591,668 A     5/1986  Iwata
5,155,760 A  *  10/1992 Johnson ............... H04M 3/533
                                                  370/428
(Continued)

OTHER PUBLICATIONS

PCT International Search Report and Written Opinion for International Application No. PCT/US2021/029073, dated Aug. 10, 2021, 12 pages.

*Primary Examiner* — Gerald Gauthier
(74) *Attorney, Agent, or Firm* — Hoffman Warnick LLC (57) ABSTRACT

Various implementations include wearable audio devices configured to record a user's voice without recording other ambient acoustic signals, such as others talking nearby. In some particular aspects, a wearable audio device includes: a frame for contacting a head of a user; an electro-acoustic transducer within the frame and configured to output audio signals; at least one microphone; a voice activity detection (VAD) accelerometer; and a controller coupled with the electro-acoustic transducer, the at least one microphone and the VAD accelerometer, the controller configured in a first mode to: detect that the user is speaking; and record a voice of the user solely with signals from the VAD accelerometer in response to detecting that the user is speaking.

18 Claims, 4 Drawing Sheets

(51) Int. Cl.
*G06N 5/04* (2006.01)
*G10L 15/22* (2006.01)
*G10L 19/018* (2013.01)
*G11B 27/00* (2006.01)
*H04N 21/43* (2011.01)
*H04N 21/439* (2011.01)

(52) U.S. Cl.
CPC .......... *G10L 19/018* (2013.01); *G11B 27/005* (2013.01); *H04N 21/4307* (2013.01); *H04N 21/439* (2013.01); *G10L 2015/223* (2013.01)

(58) Field of Classification Search
CPC .......... H04N 5/23245; H04N 21/4307; H04N 21/439; H04R 1/02; H04R 1/10; H04R 1/1008; H04R 1/1016; H04R 1/1041; H04R 1/1083; H04R 3/005; H04R 25/407; H04R 29/005; H04R 19/04; H04R 25/505; H04W 88/16; H04W 4/80; H04W 76/14; G06T 9/004; H04L 65/762; H04L 67/131; G10K 11/17854
USPC ....... 348/43; 379/406.02, 414, 88.01, 88.04; 381/57, 58, 375; 455/90.1, 412.1, 569.1; 704/201, 226, 227, 231, 208, 233, 246, 704/275; 715/716; 717/126
See application file for complete search history.

(56) References Cited

U.S. PATENT DOCUMENTS

| | | | |
|---|---|---|---|
| 5,280,524 A | 1/1994 | Norris | |
| 5,692,059 A | 11/1997 | Kruger | |
| 5,978,763 A * | 11/1999 | Bridges | G10L 25/78 704/226 |
| 6,272,459 B1 * | 8/2001 | Takahashi | G06T 9/004 704/219 |
| 6,453,020 B1 * | 9/2002 | Hughes | H04M 3/493 379/406.01 |
| 6,560,468 B1 | 5/2003 | Boesen | |
| 6,738,485 B1 | 5/2004 | Boesen | |
| 7,136,630 B2 * | 11/2006 | Xie | H04M 1/656 704/214 |
| 7,359,504 B1 * | 4/2008 | Reuss | H04M 9/082 379/406.01 |
| 7,383,181 B2 | 6/2008 | Huang et al. | |
| 7,433,484 B2 | 10/2008 | Asseily et al. | |
| 7,634,254 B2 * | 12/2009 | Xie | H04M 1/656 709/204 |
| 8,401,212 B2 | 3/2013 | Puria et al. | |
| 8,626,498 B2 | 1/2014 | Lee | |
| 8,675,884 B2 | 3/2014 | Yehuday et al. | |
| 8,792,648 B2 | 7/2014 | Kim et al. | |
| 8,838,184 B2 * | 9/2014 | Burnett | H04W 88/16 455/569.1 |
| 8,983,096 B2 | 3/2015 | Smith et al. | |
| 9,094,764 B2 | 7/2015 | Rosener | |
| 9,226,083 B2 | 12/2015 | Puria et al. | |
| 9,363,596 B2 | 6/2016 | Dusan et al. | |
| 9,381,110 B2 | 7/2016 | Huber et al. | |
| 9,438,985 B2 | 9/2016 | Dusan et al. | |
| 9,516,442 B1 * | 12/2016 | Dusan | H04R 1/1016 |
| 9,576,588 B2 | 2/2017 | Goldstein et al. | |
| 9,620,116 B2 | 4/2017 | Dadu et al. | |
| 9,949,048 B2 | 4/2018 | Isberg et al. | |
| 9,997,173 B2 | 6/2018 | Dusan et al. | |
| 10,045,112 B2 | 8/2018 | Boesen et al. | |
| 10,111,017 B2 | 10/2018 | Hillbratt et al. | |
| 10,311,889 B2 | 6/2019 | Ganeshkumar et al. | |
| 10,354,635 B2 | 7/2019 | Kemmerer et al. | |
| 10,424,315 B1 * | 9/2019 | Ganeshkumar | G10L 25/84 |
| 10,535,364 B1 * | 1/2020 | Zhong | H04R 1/02 |
| 10,595,151 B1 * | 3/2020 | Chen | H04R 3/005 |
| 10,681,453 B1 * | 6/2020 | Meiyappan | G06F 3/167 |
| 10,728,649 B1 | 7/2020 | Holman | |
| 11,138,990 B1 * | 10/2021 | McElhone | H04R 25/407 |
| 2003/0054802 A1 * | 3/2003 | Xie | H04M 1/656 455/412.1 |
| 2004/0247112 A1 * | 12/2004 | Lee | H04M 3/2236 379/414 |
| 2005/0033571 A1 | 2/2005 | Huang et al. | |
| 2005/0060149 A1 * | 3/2005 | Guduru | G10L 25/78 704/201 |
| 2005/0114118 A1 * | 5/2005 | Peck | G10L 25/87 704/E11.005 |
| 2006/0120546 A1 | 6/2006 | Tanaka et al. | |
| 2007/0021958 A1 * | 1/2007 | Visser | G10L 25/78 704/226 |
| 2008/0201138 A1 * | 8/2008 | Visser | G10L 21/0272 704/227 |
| 2008/0255842 A1 * | 10/2008 | Simhi | G10L 17/00 704/E15.001 |
| 2008/0260169 A1 * | 10/2008 | Reuss | H04R 1/10 381/74 |
| 2009/0240818 A1 * | 9/2009 | Hyndman | H04L 67/131 709/228 |
| 2010/0070266 A1 * | 3/2010 | McNeill | H04M 3/2281 379/32.04 |
| 2010/0303214 A1 * | 12/2010 | Goldman | H04M 3/53383 379/88.01 |
| 2011/0010172 A1 | 1/2011 | Konchitsky | |
| 2013/0215226 A1 * | 8/2013 | Chauvier | H04N 5/23245 348/43 |
| 2014/0024324 A1 * | 1/2014 | Mumick | G06F 3/0484 455/90.1 |
| 2014/0108928 A1 * | 4/2014 | Mumick | G06F 3/04883 715/716 |
| 2014/0214416 A1 * | 7/2014 | Yue | G10L 15/14 704/231 |
| 2014/0270200 A1 * | 9/2014 | Usher | G10L 25/78 381/74 |
| 2015/0121347 A1 * | 4/2015 | Petit | H04W 4/80 717/126 |
| 2015/0161998 A1 * | 6/2015 | Park | G10L 15/22 704/231 |
| 2015/0201271 A1 * | 7/2015 | Diethorn | H04M 1/05 381/375 |
| 2016/0111091 A1 * | 4/2016 | Bakish | G10L 15/30 704/275 |
| 2016/0241947 A1 * | 8/2016 | Degraye | G10K 11/17854 |
| 2017/0193978 A1 * | 7/2017 | Goldman | H04R 1/1083 |
| 2018/0176713 A1 * | 6/2018 | Linsky | H04W 76/14 |
| 2018/0268845 A1 * | 9/2018 | Yeo | H04R 1/1041 |
| 2018/0270565 A1 * | 9/2018 | Ganeshkumar | G10L 25/84 |
| 2018/0285056 A1 * | 10/2018 | Cutler | H04R 1/1008 |
| 2018/0350394 A1 * | 12/2018 | Saffran | H04R 1/1083 |
| 2019/0066683 A1 * | 2/2019 | Howson | G10L 15/22 |
| 2019/0287546 A1 * | 9/2019 | Ganeshkumar | H04R 1/1008 |
| 2019/0385635 A1 * | 12/2019 | Shahen Tov | G10L 25/21 |
| 2020/0051585 A1 * | 2/2020 | Guazzi | G10L 25/18 |
| 2020/0278826 A1 * | 9/2020 | Patil | H04L 65/762 |
| 2020/0296521 A1 * | 9/2020 | Wexler | G06F 1/1686 |
| 2021/0012770 A1 * | 1/2021 | Choudhary | G06F 9/451 |
| 2021/0020168 A1 * | 1/2021 | Dame | G10L 25/18 |
| 2021/0125609 A1 * | 4/2021 | Dusan | G10L 25/21 |
| 2021/0345047 A1 * | 11/2021 | Sabin | H04R 25/505 |
| 2021/0350821 A1 * | 11/2021 | Laberge | G06N 20/00 |

* cited by examiner

WEARABLE AUDIO DEVICE WITH USER OWN-VOICE RECORDING

TECHNICAL FIELD

This disclosure generally relates to wearable audio devices. More particularly, the disclosure relates to wearable audio devices configured to enhance user own-voice recording.

BACKGROUND

There are various scenarios when a user may wish to record his or her own voice. For example, a user may wish to make a verbal to-do lists, journal her day or moments in her life, or analyze her speech patterns or tone-of-voice at times. Given that commonly used devices such as smart devices and wearable audio devices include microphones, it would seem logical that a user could rely on these devices to perform own voice recording. However, conventional smart devices (e.g., smart phones, smart watches) and wearable audio devices (e.g., headphones, earphones, etc.) may not be able to effectively isolate the user's own voice from ambient acoustic signals.

SUMMARY

All examples and features mentioned below can be combined in any technically possible way.

Various implementations include wearable audio devices. The wearable audio devices are configured to record a user's voice without recording other ambient acoustic signals, such as others talking nearby.

In some particular aspects, a wearable audio device includes: a frame for contacting a head of a user; an electro-acoustic transducer within the frame and configured to output audio signals; at least one microphone; a voice activity detection (VAD) accelerometer; and a controller coupled with the electro-acoustic transducer, the at least one microphone and the VAD accelerometer, the controller configured in a first mode to: detect that the user is speaking; and record a voice of the user solely with signals from the VAD accelerometer in response to detecting that the user is speaking.

In additional particular aspects, a computer-implemented method includes: at a wearable audio device having: a frame for contacting a head of a user; an electro-acoustic transducer within the frame and configured to output audio signals; at least one microphone; and a voice activity detection (VAD) accelerometer; in a first mode: detect that the user is speaking; and record a voice of the user solely with signals from the VAD accelerometer in response to detecting that the user is speaking.

In further particular aspects, a wearable audio device includes: a frame for contacting a head of a user; an electro-acoustic transducer within the frame and configured to output audio signals; at least one microphone; a voice activity detection (VAD) device; and a controller coupled with the electro-acoustic transducer, the at least one microphone and the VAD device, the controller configured in a first mode to: detect that the user is speaking; and record a voice of the user solely with signals from the VAD device in response to detecting that the user is speaking, where the VAD device includes at least one of: a light-based sensor, a sealed volume microphone, or a feedback microphone.

Implementations may include one of the following features, or any combination thereof.

In certain aspects, the VAD accelerometer maintains contact with the head of the user during the recording or is separated from the head of the user during at least a portion of the recording.

In particular cases, in a second mode, the controller is configured to adjust a directionality of audio pickup from the at least one microphone to at least one of: verify that the user is speaking or enhance quality of the recording.

In some implementations, the wearable audio device further includes an additional VAD system for verifying that the user is speaking prior to initiating the recording.

In certain cases, the controller is further configured, in response to detecting that only the user is speaking, to communicate with a smart device connected with the wearable audio device to initiate natural language processing (NLP) of commands in the voice of the user as detected at the at least one microphone on the wearable audio device or a microphone array on the smart device.

In some aspects, after detecting that only the user is speaking, the NLP is performed without requiring a wake word.

In particular implementations, the controller is further configured to: request feedback from the user to verify that the user is speaking; train a logic engine to recognize that the user is speaking based on a received response to the feedback request; and after the training, run the logic engine to detect future instances of the user speaking for enabling recording using solely the VAD accelerometer.

In certain aspects, the wearable audio device further includes a memory for storing a predefined quantity of voice recording from the user.

In some cases, the recording of the voice of the user is accessible via a processor to perform at least one of: a) analyze the voice recording for at least one of speech patterns or tone of voice, b) playback the voice recording in response to a request from the user, or c) execute virtual personal assistant (VPA) commands based on the voice recording.

In particular aspects, in a second mode, the controller activates the at least one microphone to record all detectable ambient audio.

In certain implementations, the controller is configured to switch from the first mode to the second mode in response to a user command.

In some aspects, the wearable audio device further includes a digital signal processor (DSP) coupled with the controller, where the controller is further configured to activate the DSP to enhance the recorded voice of the user during the recording.

In particular cases, the controller is further configured to initiate playback of the recording by at least one of: a) accelerating playback of the recording, b) playing back only select portions of the recording, or c) adjusting a playback speed of one or more select portions of the recording.

In certain implementations, the VAD accelerometer includes a bone conduction pickup transducer.

In some aspects, the controller is further configured to enable voiceover recording of a television or streaming program using the VAD accelerometer and the at least one microphone by: finger printing audio output associated with the television or streaming program with the at least one microphone while recording the voice of the user with the signals from the VAD accelerometer; compiling the finger printed audio output with the recorded voice of the user; and providing the compiled finger printed audio output and recorded voice of the user for subsequent synchronized playback with the television or streaming program.

Two or more features described in this disclosure, including those described in this summary section, may be combined to form implementations not specifically described herein.

The details of one or more implementations are set forth in the accompanying drawings and the description below. Other features, objects and benefits will be apparent from the description and drawings, and from the claims.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that a wearable audio device can be configured to privately record a user's own voice. For example, wearable audio devices disclosed according to implementations can provide a user with the ability to record her own voice while excluding ambient acoustic signals such as voices of other nearby users. In particular cases, the wearable audio device utilizes a voice activity detection (VAD) device such as a VAD accelerometer to exclusively record the voice of the user.

Commonly labeled components in the FIGURES are considered to be substantially equivalent components for the purposes of illustration, and redundant discussion of those components is omitted for clarity. Numerical ranges and values described according to various implementations are merely examples of such ranges and values, and are not intended to be limiting of those implementations. In some cases, the term "approximately" is used to modify values, and in these cases, can refer to that value +/− a margin of error, such as a measurement error.

Aspects and implementations disclosed herein may be applicable to a wide variety of wearable audio devices in various form factors, such as head-worn devices (e.g., headsets, headphones, earphones, eyeglasses, helmets, hats, visors), neck-worn speakers, shoulder-worn speakers, body-worn speakers (e.g., watches), etc. Some particular aspects disclosed may be applicable to personal (wearable) audio devices such as head-mounted audio devices, including headphones, earphones, helmets, hats, visors, eyeglasses, etc. It should be noted that although specific implementations of audio devices primarily serving the purpose of acoustically outputting audio are presented with some degree of detail, such presentations of specific implementations are intended to facilitate understanding through provision of examples and should not be taken as limiting either the scope of disclosure or the scope of claim coverage.

Aspects and implementations disclosed herein may be applicable to wearable audio devices that either do or do not support two-way communications, and either do or do not support active noise reduction (ANR). For wearable audio devices that do support either two-way communications or ANR, it is intended that what is disclosed and claimed herein is applicable to a speaker system incorporating one or more microphones disposed on a portion of the wearable audio devices that remains outside an ear when in use (e.g., feedforward microphones), on a portion that is inserted into a portion of an ear when in use (e.g., feedback microphones), or disposed on both of such portions. Still other implementations of wearable audio devices to which what is disclosed and what is claimed herein is applicable will be apparent to those skilled in the art.

The wearable audio devices disclosed herein can include additional features and capabilities not explicitly described. These wearable audio devices can include additional hardware components, such as one or more cameras, location tracking devices, microphones, etc., and may be capable of voice recognition, visual recognition, and other smart device functions. The description of wearable audio devices included herein is not intended to exclude these additional capabilities in such a device.

Figure 1:
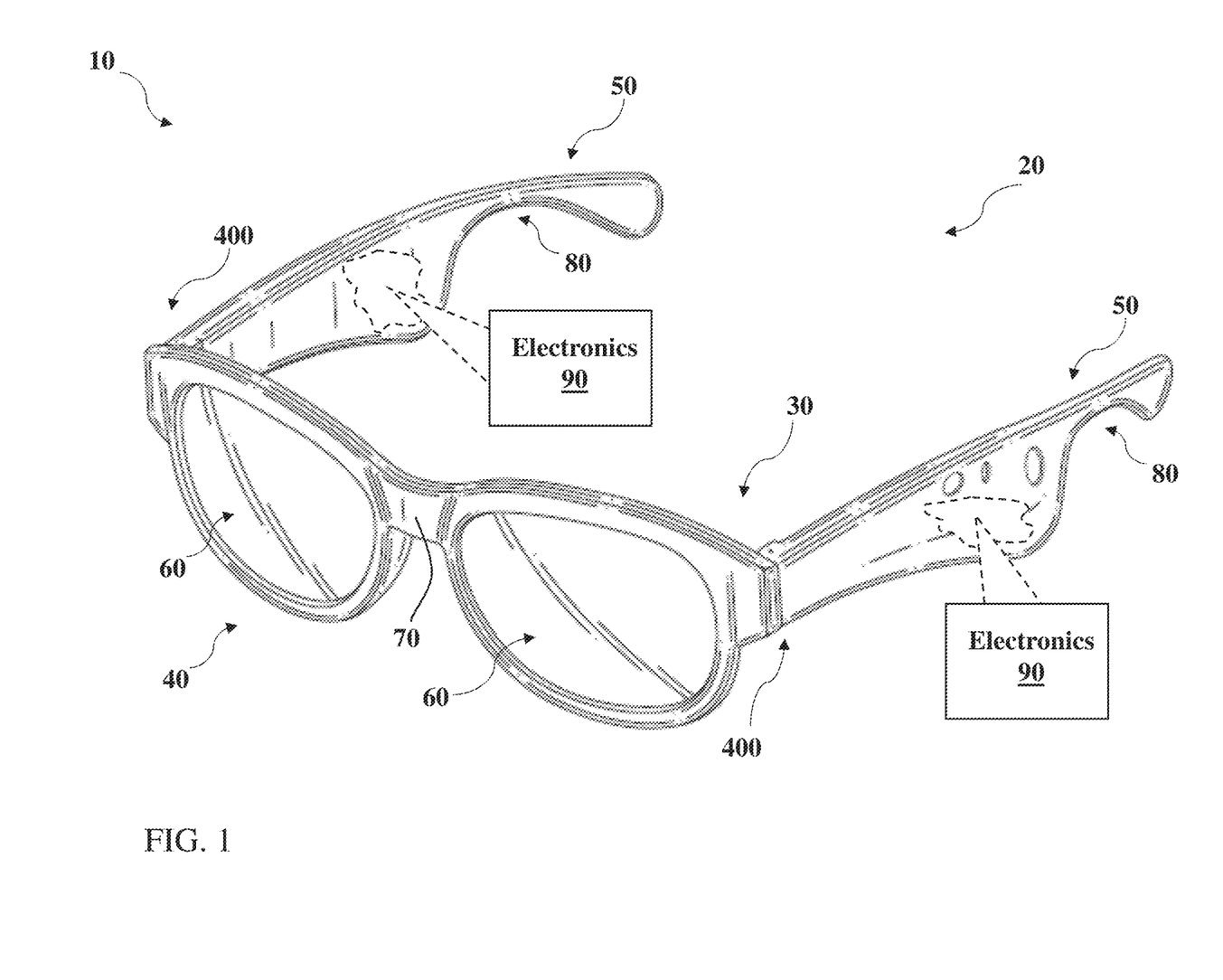
FIG. 1 is a perspective view of an example audio device according to various implementations.

FIG. 1 is a schematic depiction of a wearable audio device 10 according to various implementations. In this example implementation, the wearable audio device 10 is a pair of audio eyeglasses 20. As shown, the wearable audio device 10 can include a frame 30 having a first section (e.g., lens section) 40 and at least one additional section (e.g., arm sections) 50 extending from the first section 40. In this example, as with conventional eyeglasses, the first (or, lens) section 40 and additional section(s) (arms) 50 are designed for resting on the head of a user. In this example, the lens section 40 can include a set of lenses 60, which can include prescription, non-prescription and/or light-filtering lenses, as well as a bridge 70 (which may include padding) for resting on the user's nose. Arms 50 can include a contour 80 for resting on the user's respective ears.

Contained within the frame 30 (or substantially contained, such that a component can extend beyond the boundary of the frame) are electronics 90 and other components for controlling the wearable audio device 10 according to particular implementations. In some cases, separate, or duplicate sets of electronics 90 are contained in portions of the frame, e.g., each of the respective arms 50 in the frame 30. However, certain components described herein can also be present in singular form.

Figure 2:
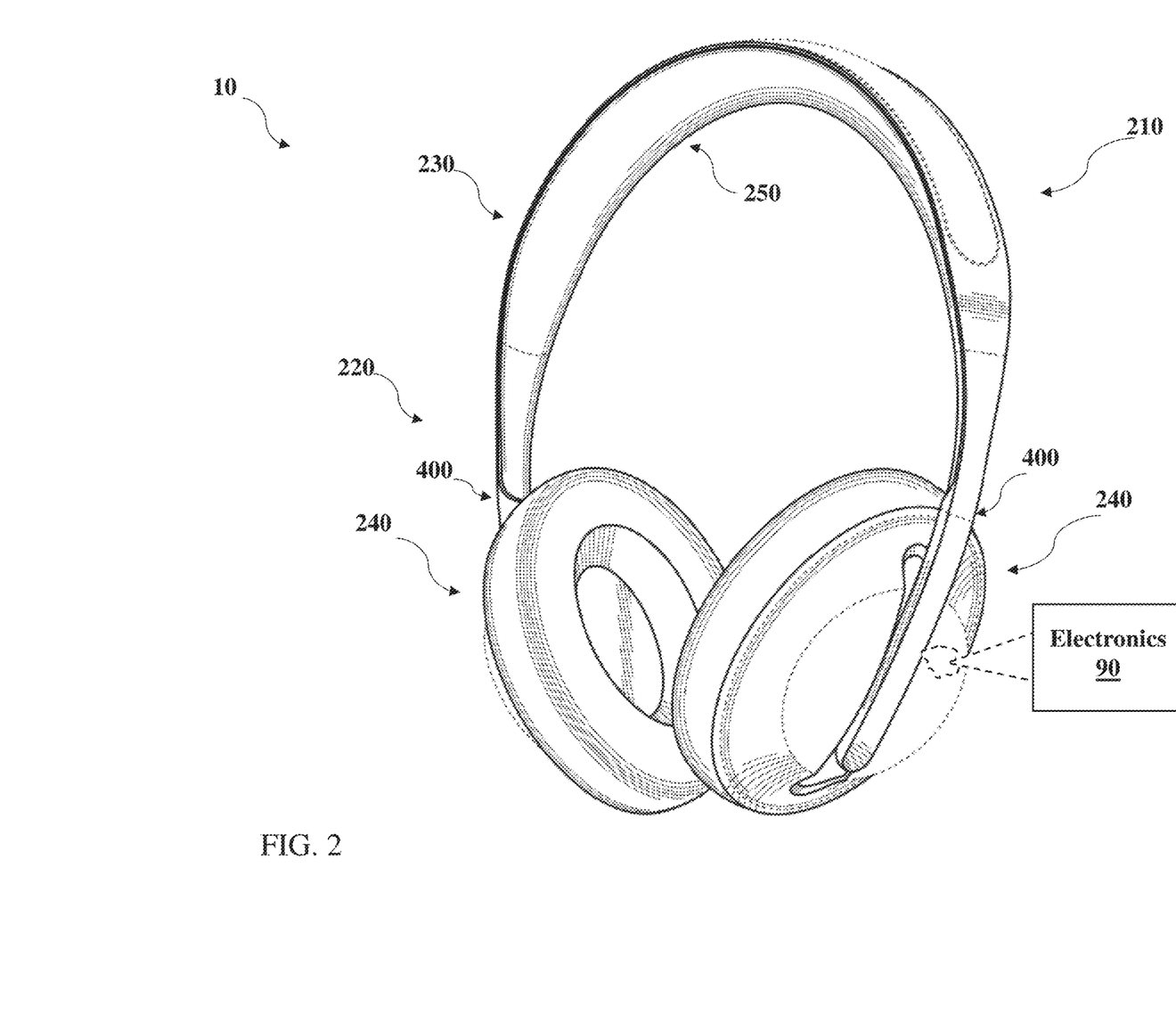
FIG. 2 is a perspective view of another example audio device according to various implementations.

FIG. 2 depicts another example wearable audio device 10 in the form of headphones 210. In some cases, the headphones 210 include on-ear or around-ear headphones 210. The headphones 210 can include a frame 220 with a first section (e.g., headband) 230 and at least one additional section (e.g., earcup(s)) 240 extending from the first section 230. In various implementations, the headband 230 includes a head cushion 250. Stored within one or both of the earcups 240 are electronics 90 and other components for controlling the wearable audio device 10 according to particular implementations. It is understood that headphones 210 depicted in FIG. 2 are merely one example form factor, and that in-ear headphones (also referred to as earphones or earbuds) helmets, visors, etc. can include electronics 90 capable of performing functions described herein.

Figure 3:
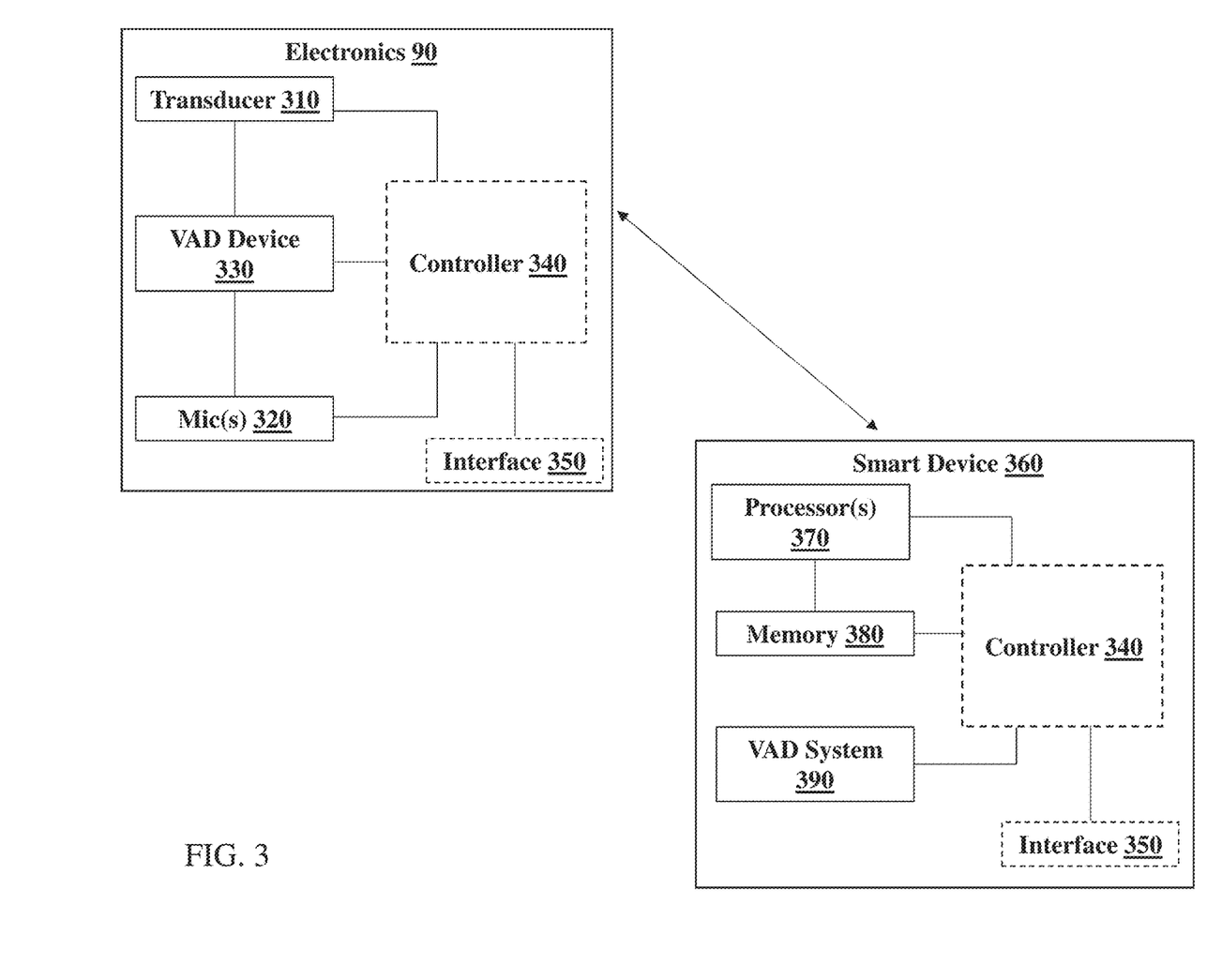
FIG. 3 is a system diagram illustrating electronics in an audio device, and a smart device in communication with the electronics, according to various implementations.

FIG. 3 shows a schematic depiction of the electronics 90 contained within the frame 30 (FIG. 1) and/or the frame 220 (FIG. 2). It is understood that one or more of the components in electronics 90 may be implemented as hardware and/or software, and that such components may be connected by any conventional means (e.g., hard-wired and/or wireless connection). It is further understood that any component described as connected or coupled to another component in the wearable audio device 10 or other systems disclosed according to implementations may communicate using any conventional hard-wired connection and/or additional communications protocols. In various particular implementations, separately housed components in wearable audio device 10 are configured to communicate using one or more conventional wireless transceivers.

As shown in FIG. 3, electronics 90 at least partially contained within the frame 20 (FIG. 1) or frame 210 (FIG. 2) can include a transducer 310 (e.g., electro-acoustic transducer), at least one microphone (e.g., a single microphone or an array of microphones) 320, and a voice activity detection (VAD) device 330. Each of the transducer 310, microphone(s) 320 and power source 330 are connected with a controller 340, which is configured to perform control functions according to various implementations described herein. Controller 340 can be coupled with other components in the electronics 90 via any conventional wireless and/or hardwired connection which allows controller 340 to send/receive signals to/from those components and control operation thereof.

Electronics 90 can include other components not specifically depicted herein, such as one or more power sources, memory and/or processors, motion/movement detection components (e.g., an inertial measurement unit, gyroscope/magnetometer, etc.), communications components (e.g., a wireless transceiver (WT)) configured to communicate with one or more other electronic devices connected via one or more wireless networks (e.g., a local WiFi network, Bluetooth connection, or radio frequency (RF) connection), and amplification and signal processing components. It is understood that these components or functional equivalents of these components can be connected with, or form part of, the controller 340. In additional optional implementations, the electronics 90 can include an interface 350 coupled with the controller 340 for enabling functions such as audio selection, powering on the audio device or engaging a voice control function. In certain cases, the interface 350 includes a button, a compressible interface and/or a capacitive touch interface. Various additional functions of the electronics 90 are described in U.S. Pat. No. 10,353,221, incorporated by reference herein in its entirety.

In some implementations, one or more components in the electronics 90, or functions performed by such components, are located or performed on a smart device 360, such as a smart phone, smart watch, tablet, laptop computer or other computing device. In various implementations, one or more functions of the controller 340 can be executed using one or more control circuits and/or chips at the smart device 360. In particular cases, actions of the controller 340 are executed as software functions via one or more controllers 340. In some cases, the smart device 360 includes the interface 350 for interacting with controller 340, however, in other cases, both the wearable audio device 10 and the smart device 350 have separate interfaces 350. In certain cases, the smart device 360 includes at least one processor 370 (e.g., one or more processors, which can include digital signal processor(s)) and memory 380. In some cases, the smart device 360 also includes an additional VAD system 390, which can include one or more microphones for detecting voice activity, e.g., from a user of the wearable audio device 10 and/or another user. In certain cases, as described herein, the additional VAD system 390 can be used to verify that a user is speaking, and can be used in conjunction with the VAD device 330 at electronics 90.

Figure 4:
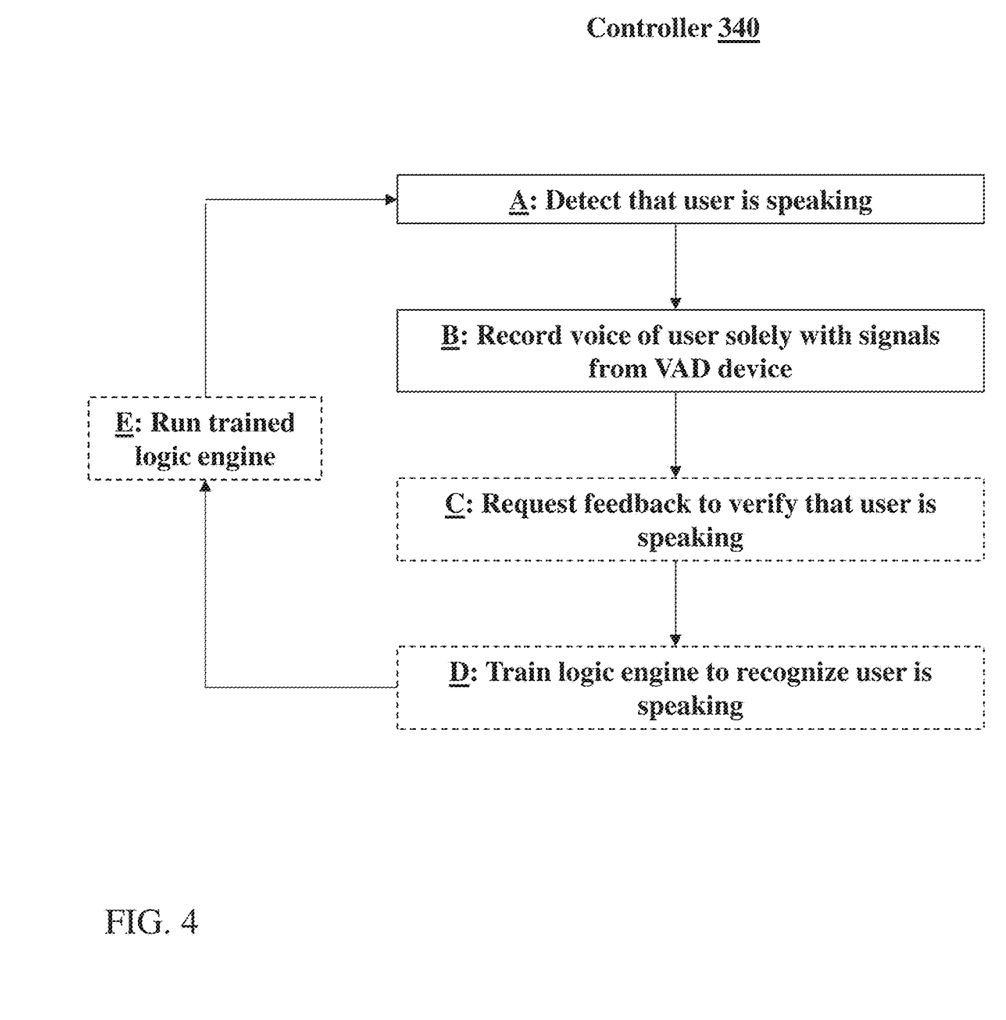
FIG. 4 is a flow diagram illustrating processes performed by a controller according to various implementations.

In particular implementations, the controller 340 is configured to operate in one or more modes. FIG. 4 is a flow diagram illustrating example processes performed by the controller 340, in a first mode. In some cases, in the first mode, the controller 340 is configured to perform the following processes:

A) Detect that the user (of the wearable audio device 10) is speaking; and

B) Record a voice of the user solely with signals from the VAD device 330 located on the wearable audio device 10 in response to detecting that the user is speaking.

That is, in the first mode, the controller 340 is configured to specifically record user voice signals without capturing signals from ambient acoustic sources such as (voices of) other users. As described herein, the wearable audio device 10 enables this recording by using the VAD device 330 (FIG. 3) that is positioned to record signals indicative of the user's voice without recording ambient acoustic signals. In particular cases, controller 340 initiates recording solely using the signals from the VAD device 330, such that signals detected by the microphones 320 or additional ambient acoustic signal detection devices are excluded (e.g., using a logic-based VAD component).

In various additional implementations, the controller 340 is configured to improve the ability to detect that the user is speaking with training, e.g., using a machine learning or other artificial intelligence component such as an artificial neural network. These additional processes are illustrated in phantom in FIG. 4, as optional implementations. In these cases, after the controller 340 detects that the user is speaking (process A, above), controller 340 is configured to:

C) Request feedback from the user to verify that the user is speaking. In some cases, the controller 340 requests user feedback via one or more interfaces 350, e.g., requests and/or responses via audio, tactile and/or gesture-based interface.

D) Train a logic engine to recognize that the user is speaking based on a received response to the feedback request. In some cases, the logic engine is contained in the controller 340, either at the wearable audio device 10 or the smart device 360. In other implementations, the logic engine is executed at the smart device 360 or in a cloud-based platform and can include a machine learning component.

E) After training, run the logic engine to detect future instances of the user speaking for enabling recording using solely the VAD device 330. In these processes, the controller 340 either includes or accesses the logic engine, once trained, to detect that the user is speaking. This process is illustrated in FIG. 4 as improving process A, detecting that the user is speaking.

In certain implementations, the VAD device 330 includes a VAD accelerometer. In particular cases, the VAD accelerometer is positioned on the frame (e.g., frame 20 (FIG. 1) or frame 210 (FIG. 2)) such that it maintains contact with the user's head while the wearable audio device 10 is worn by that user. That is, in particular cases, the VAD accelerometer is positioned on a portion of the frame such that it contacts the user's head during use of the wearable audio device 10. In other cases, however, the VAD accelerometer does not always contact the head of the user, such that it is physically separated from the user's head during at least some portion of the use of the wearable audio device 10. In various particular implementations, the VAD accelerometer includes a bone conduction pickup transducer that is configured to detect vibration(s) conducted via the user's bone structure.

While in some cases the VAD device 330 is described as including a VAD accelerometer, in other cases, the VAD device 330 can include one or more additional or alternative voice activity detection components, including for example, a light-based sensor, a sealed volume microphone and/or a feedback microphone. In some examples, the light-based sensor can include an infra-red (IR) and/or laser sensor that is configured to detect movement of the user's mouth. In these cases, the light-based sensor can be positioned on the frame (e.g., frame 20 (FIG. 1) or frame 210 (FIG. 2)) to direct light at the user's mouth region, e.g., to detect movement of the user's mouth. The VAD device 330 can additionally or alternatively include a sealed volume microphone that is enclosed to prevent detection of external acoustic signals. In these cases, the sealed volume microphone can be one or more of the microphones 320 (FIG. 3), or can be a separate microphone that is dedicated as the VAD device 330 on the wearable audio device 10. In particular examples, the sealed volume microphone includes a microphone that is substantially surrounded except for one side that is directed toward the user, e.g., toward the location of the user's mouth. In some cases, the sealed volume microphone resides in an acoustically isolating housing that defines a sealed volume behind the microphone. In still further implementations, the VAD device 330 can include a feedback microphone that is located in a front cavity of the wearable audio device 10, e.g., in a portion of the frame (e.g., frame 20 (FIG. 1) or frame 210 (FIG. 2)) that is located proximate the user's mouth. In certain cases, the feedback microphone includes one or more of the microphones 320 (FIG. 3), or is a separate microphone that is dedicated as the VAD device 330. In some cases, the feedback microphone is also located in an acoustically isolating housing, e.g., similar to the sealed volume microphone.

Particular implementations are described where the VAD device 330 is a VAD accelerometer that includes a bone conduction pickup transducer. However, it is understood that regardless of the specific form of the VAD device 330, the controller 340 is configured to isolate signals from the VAD device 330 to record the user's own voice without capturing ambient acoustic signals.

As noted herein, in additional implementations, the controller 340 is configured to operate in one or more additional modes. For example, in another mode, the controller 340 is configured to adjust a directionality of audio pickup from the microphone(s) 320. In some cases, the controller 340 is configured to adjust the directionality of the audio pickup from the microphone(s) 320 to verify that the user is speaking and/or enhance quality of the recording. For example, in response to detecting that the user is speaking (e.g., receiving signals from the VAD device 330 indicating that the user is speaking and/or receiving signals from the VAD system 390 (FIG. 3) indicating that the user is speaking), the controller 340 is configured to adjust the directionality of the microphones 320. Microphone directionality can be adjusted by modifying a gain on signals detected by one or more microphones 320, as well as performing a beamforming process to enhance signals from one or more directions relative to other directions (e.g., creating a null in directions other than those directed proximate to the user's mouth). Other approaches for adjusting microphone directionality are also possible.

In certain implementations, in response to detecting that the user is speaking based on signals from the VAD device 330, the controller 340 adjusts the microphone directionality at microphones 320 to verify that the user is speaking, e.g., by directing the microphones 320 toward the user's mouth and performing analysis on the signals received (e.g., voice recognition). In some cases, the controller 340 is only configured to record the signals from the VAD device 330 in response to verifying that the user is speaking, e.g., with confirmation from signals received via microphones 320. In other implementations, in response to detecting that the user is speaking based on signals from the VAD device 330, the controller 340 adjusts the microphone directionality at microphones 320 to enhance the quality of the recording from the VAD device 330. In these cases, the controller 340 is configured to identify frequencies of signals other than the user's voice (e.g., low frequency sounds or high frequency sounds such as appliances humming, motor vehicles driving nearby, or background music) and perform signal processing on the signals from the VAD device 330 to exclude those frequencies (or frequency ranges) from the recording. Examples of such signal processing and beamforming techniques are described in further detail in U.S. Pat. No. 10,311,889, which is incorporated by reference in its entirety.

In particular cases, the controller 340 is configured to use the additional VAD system 390 to verify that the user is speaking prior to initiating recording from the VAD device 330. In these cases, the controller 340 can utilize signals from VAD system 390 to verify that the user is speaking. In the case that the VAD system 390 includes one or more microphones, this process can be performed using those microphones in a similar manner to verifying that the user is speaking with directional adjustment of microphones 320 (described herein). In these cases, the controller 340 is configured not to record the signals from the VAD device 330 unless the VAD system 390 verifies that the user is speaking, e.g., by verifying that signals detected by the VAD system 390 include user voice signals.

In various implementations, the controller 340 is also configured to use voice signals as detected by the microphones 320 to selectively enable voice control at the audio device 10. For example, in some cases the controller 340 is configured, in response to detecting that only the user is speaking, to communicate with the smart device 360 to initiate natural language processing (NLP) of commands in the voice of the user as detected at the microphone(s) 320 and/or at microphones in the VAD system 390 at the smart device 360. In these cases, the controller 340 is configured to detect that only the user is speaking, and in response, sends detected voice signal data to the smart device 360 for processing (e.g., via one or more processor(s) such as NLP processors). In certain cases, after detecting that only the user is speaking, the NLP is performed without requiring a wake word. That is, the controller 340 can be configured to initiate NLP on commands from the user without requiring a wake word (e.g., "Hey, Bose" or "Bose, please play music by Artist X"). In these implementations, the controller 340 enables user voice control of one or more functions of the wearable audio device 10 and/or the smart device 360 without requiring a wake word.

According to implementations, the controller 340 is configured to switch between modes automatically (e.g., in response to detecting conditions at the audio device 10 such as detecting that the user is speaking, or detecting that nearby users are speaking), or in response to a user command. In particular cases, the controller 340 enables the user to switch between modes with a user command, e.g., via interface 350. In these cases, the user can switch between recording all signals detected at the VAD device 330, to recording none of the signals at the VAD device 330 (or disabling the VAD device 330). In still other cases, the controller 340 enables the user to switch to a full-record mode that activates the microphones 320 to record all detectable ambient audio. In some examples, the user provides a command to interface 350 (e.g., user interface command such as a tactile interface command, voice command or gesture command) and the controller 340 (in response to detecting that command) switches to the full-record mode by activating microphones 320 and initiating recording of all signals received at the microphones 320. In particular cases, these microphone signals may be recorded in addition to signals from the VAD device 330.

In certain implementations, the memory 380 is configured to store a predefined quantity of voice recording from the user. While the memory 360 is illustrated as being located at the smart device 380 in FIG. 3, one or more portions of the memory 380 can be located at the wearable audio device 10 and/or in a cloud-based system (e.g., a cloud server with memory). In some cases, the recording of the user's voice is accessible (e.g., via processor 370 or another processor at wearable audio device 10 and/or smart device 360) to: i) analyze the voice recording for at least one of speech patterns or tone of voice, ii) playback the voice recording in response to a request from the user, and/or iii) execute virtual personal assistant (VPA) commands based on the voice recording. In some cases, the voice recording of the user is analyzed for speech patterns and/or tone of voice, e.g., frequency of word usage such as curse words, placeholder terms (e.g., "uh", "um", "okay"), cadence of speech, coughing, sneezing, breathing (e.g., loud breathing), burping, etc. In certain implementations, the controller 340 enables the user to select how the voice recording is analyzed. For example, the controller 340 can be configured to enable the user to select one or more analysis modes for the voice recording, e.g., one or more particular speech patterns or vocal tone analyses. In a particular case, a user can select to analyze her voice recording for use of placeholder terms (e.g., "um" or "uh") or cadence (e.g., extended pauses or rushing through sentences).

In still further implementations, the controller 340 is configured to enhance or otherwise adjust the recorded voice of the user, e.g., during recording. For example, the controller 340 can be coupled with one or more digital signal processors (DSPs), such as those included in processors 370 on the smart device 360 or in additional DSP circuitry in the electronics 90. The controller 340 can be configured to activate the DSP to enhance the recorded voice of the user during the recording. In some particular cases, the controller 340 is configured to increase the signal-to-noise ratio (SNR) of the signals from the VAD device 330 to enhance the recorded voice of the user. In certain cases, the controller 340 filters out frequencies (or ranges) detected at the VAD device 330 that are known to be, or likely are, associated with noise or sounds other than the user's voice. For example, the controller 340 can be configured to filter out low-level vibrations and/or high-frequency sounds that are detectable by the VAD device 330 in order to enhance SNR. In particular examples, the controller 340 uses high pass filtering to remove low frequency noise, e.g., from mechanical systems or wind. In other particular examples, the controller 340 uses low pass or band pass filtering to remove other noise sources. In further examples, the controller 340 applies one or more filter models to detected noise, such as filter models developed with machine learning.

In certain additional implementations, the controller 340 is configured to retrieve the recorded audio (voice) of the user, e.g., for playback. In some cases, controller 340 is configured to initiate playback of the recording (of the user's voice) at the wearable audio device 10 (e.g., at transducer 310), at the smart device 360 (e.g., at one or more transducers), and/or at another playback device. In particular cases, the controller 340 is configured to initiate playback of the recording of the user's voice at the transducer 310. In certain cases, the controller 340 is configured to initiate playback of the recording by: a) accelerating playback of the recording, b) playing back only select portions of the recording, and/or c) adjusting a playback speed of one or more select portions of the recording. For example, the user may wish to accelerate playback of the recording in order to hear a greater amount of her voice recording over a shorter time. In other cases, the user may wish to play back only select portions of her voice recording, e.g., a particular conversation that occurred during a time of day, a verbal diary/journal entry, a verbal note-to-self or reminder placed at a certain time of day or while present at a certain location (e.g., as correlated with location data). In still other cases, the user may wish to adjust the playback speed of one or more select portions of the recording, e.g., accelerate or decelerate playback at times of day, or during particular conversations with other users.

In still further implementations, the controller 340 is configured to enable one or more voiceover functions. In some examples, the controller 340 is configured to enable users to record, replay and/or share commentary or other voiceover content. For example, in one process a user may desire to save-and-replay and/or share commentary of a television or streaming program, e.g., an episode of a program, a movie, a broadcast sporting event, etc. In these examples, the television or streaming program includes audio output. In this example, the user wearing audio device 10 starts viewing the television or streaming program and actuates the controller 340 (e.g., via an interface command) to begin recording commentary or other voiceover content. In response to the command to record commentary or voiceover content, the controller 340 is configured to record the user's own voice according to the various approaches described herein (e.g., with VAD device 330). Additionally, during the commentary or voiceover recording process, the controller 340 is configured to perform finger-printing of the audio from the television or streaming program, e.g., as output at a television, personal computer/laptop, smart device or other streaming or broadcasting device. In these cases, the controller 340 is configured to record timing-related data (or "fingerprints") from the television or streaming program audio that enables synchronizing the commentary or voiceover recording with separate broadcasting or playback of the television or streaming program by a distinct user. Using conventional finger-printing, the controller 340 is configured to record the user's own voice (e.g., commentary) without recording the audio from the television or streaming program. This can be beneficial in cases where the audio from the television or streaming program is subject to certain intellectual property rights, e.g., copyrights. The user can pause or finish recording (e.g., voiceover recording) using any interface command described herein.

After recording the user's voiceover content, that content can be saved or otherwise transmitted as one or more data files (e.g., via a software application executed or otherwise accessible via controller 340) and made available for subsequent playback. In some cases, the controller 340 uploads the voiceover content data to a database or otherwise accessible platform such as a cloud-based platform. In these cases, the recording user, or a distinct user, can access the voiceover content that was previously recorded. For example, a second user with an audio device (e.g., audio device 10) can provide an interface command that is detected at the controller 340 for accessing the voiceover content. In these cases, the controller 340 can provide a notification or other indicator to the user that voiceover content is available for one or more television or streaming programs. In any case, with the controller 340 active, the user can initiate playback of the television or streaming program (e.g., via television interface, streaming service, on-demand service, etc.). The microphone(s) at audio device 10 are configured to detect the audio playback associated with the television or streaming program, and using the finger printing data, synchronize the voiceover content from the first user with the playback of the television or streaming program. In these cases, the controller 340 is configured to mix the voiceover content from the first user with the audio playback of the television or streaming program for output at the transducer(s) 310.

As noted herein, in contrast to conventional systems and approaches for recording a user's voice, the various disclosed implementations enable private user own-voice recording in a wearable audio device. In various implementations, the wearable audio device and related approaches allow the user to minimize or eliminate interface interactions and still record her voice, e.g., for subsequent playback. The user can experience the many benefits from own-voice recording without the negative consequences of detecting additional user's voices in that recording. Additionally, these wearable audio devices can enable analysis and feedback about the user's voice recording, e.g., via transmission to one or more connected devices such as smart devices or cloud-based devices with additional processing capabilities.

In further implementations, the audio device 10 enables two or more users to wirelessly communicate using functions of the controller 340. In particular, the controller 340 can enable direct communication between two or more users each wearing an audio device 10. These implementations can have a variety of applications. For example, these implementations can be beneficial in environments where persistent low-latency communication is desirable, e.g., in a loud factories or dispersed work environments. These implementations can also be beneficial in environments where internet or other internal network connections are unreliable, such as in remote environments (e.g., offshore or off-grid environments like oil rigs). These implementations can also be beneficial in relatively quiet environments where users may wish to speak with one another in softer or quieter voices. In louder environments such as concerts, nightclubs, or sporting events, these implementations can enable users of audio devices 10 to communicate without needing to significantly raise their voices. Even further, these implementations can aid users who are hard of hearing in communicating with others, e.g., where the audio device 10 user is communicating with one or more other users wearing an audio device 10 in a noisy environment or an environment with varied acoustic characteristics (e.g., using components in audio device 10 and/or smart device 360).

However, in contrast to conventional configurations, the audio devices 10 disclosed according to various implementations are able to isolate the user's own voice, e.g., for transmission to the other user(s). For example, in certain conventional configurations, devices that are proximate one another will detect not only the voice of a first user (e.g., the user wearing a first device, when speaking), but will also detect the voice of a second user (e.g., a different user wearing a second device, when speaking). In this sense, when relying on transmission of detected voice signals to communicate, the second user is likely to hear not only the voice of the first user, but also her own voice (e.g., echo) as detected by the first device and played back after transmission between the devices. This echo phenomenon can be irritating and hinder communication. In contrast, the controller 340 is configured to transmit voice pickup from a user wearing the audio device 10 solely with signals from the VAD device 330 (and/or VAD system 390, where applicable), avoiding or significantly reducing pickup of the user's own voice at the other device (e.g., echo). Benefits of these implementations can be further pronounced when more than two people are speaking using audio devices 10, e.g., in a larger conversation, work environment, sporting event, coordinated group task or mission, etc.

In certain of these cases, the controller 340 is also programmed to detect when users of audio devices 10 are within a defined proximity of one another. Proximity detection can be performed according to a number of known techniques, including, e.g., device detection by communications protocol (e.g., Bluetooth or BLE), common network or cellular connection, positioning information (e.g., GPS data), etc. In some cases, devices 10 running the controller 340 are configured in one or more operating modes to share location information with other devices 10 also running the controller 340. Additional aspects of proximity detection are described in U.S. patent application Ser. No. 16/267,643 (Location-Based Personal Audio, filed on Feb. 5, 2019), which is incorporated by reference in its entirety. In certain cases, when audio devices 10 are in close proximity to one another but still transmitting VAD-detected audio, it is possible that a user could hear both her own voice (while speaking), as well as any portion of her speech that is detected at the second audio device 10. In these cases, the controller 340 is configured to vary the volume of the transmitted audio based on the proximity between the audio devices 10, e.g., lowering the volume of the transmitted audio as the controller 340 receives an indicator that the devices 10 are getting closer, and increasing the volume in response to an indicator that the devices 10 are getting farther apart. In certain cases, the controller 340 is also configured to detect whether voice signals received from another audio device 10 are also detectable due to proximity (e.g., via pickup at microphones 320). That is, the controller 340 at a first audio device 10 is configured to detect when a second user's voice (transmitted as VAD-based signal from a second audio device 10) is also detectable in the environment proximate the first user, and adjust the output at the first audio device 10. In some cases, the controller 340 modifies these settings based on whether noise cancelation is activated at the first audio device 10, e.g., when the controller 340 detects that noise cancellation is activated or set to cancel significant noise, the controller 340 allows playthrough of the VAD-detected signals from the second user's audio device 10 without modification. In other cases, when the controller 340 detects that noise cancellation is not activated or is set to a low level of cancelation, the controller 340 stops playthrough of the VAD-detected signals to avoid interfering with the open-air voice signals that the first user hears. In any case, these dynamic adjustments by controller 340 significantly improve the user experience relative to conventional systems and approaches.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

Additionally, actions associated with implementing all or part of the functions described herein can be performed by one or more networked computing devices. Networked computing devices can be connected over a network, e.g., one or more wired and/or wireless networks such as a local area network (LAN), wide area network (WAN), personal area network (PAN), Internet-connected devices and/or networks and/or a cloud-based computing (e.g., cloud-based servers).

In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

The term "approximately" as used with respect to values denoted herein can allot for a nominal variation from absolute values, e.g., of several percent or less.

A number of implementations have been described. Nevertheless, it will be understood that additional modifications may be made without departing from the scope of the inventive concepts described herein, and, accordingly, other implementations are within the scope of the following claims.

We claim:

1. A wearable audio device, comprising:
 a frame for contacting a head of a user;
 an electro-acoustic transducer within the frame and configured to output audio signals;
 at least one microphone;
 a voice activity detection (VAD) accelerometer; and
 a controller coupled with the electro-acoustic transducer, the at least one microphone and the VAD accelerometer, the controller configured in a first mode to:
  detect that the user is speaking; and
  record a voice of the user solely with signals from the VAD accelerometer in response to detecting that the user is speaking,
  wherein recording the voice of the user solely with the signals from the VAD accelerometer excludes signals detected by the at least one microphone.

2. The wearable audio device of claim 1, wherein the VAD accelerometer maintains contact with the head of the user during the recording or is separated from the head of the user during at least a portion of the recording.

3. The wearable audio device of claim 1, wherein, in a second mode, the controller is configured to adjust a directionality of audio pickup from the at least one microphone to at least one of: verify that the user is speaking or enhance quality of the recording.

4. The wearable audio device of claim 1, further comprising an additional VAD system for verifying that the user is speaking prior to initiating the recording.

5. The wearable audio device of claim 1, wherein the controller is further configured, in response to detecting that only the user is speaking, to communicate with a smart device connected with the wearable audio device to initiate natural language processing (NLP) of commands in the voice of the user as detected at the at least one microphone on the wearable audio device or a microphone array on the smart device.

6. The wearable audio device of claim 5, wherein after detecting that only the user is speaking, the NLP is performed without requiring a wake word.

7. The wearable audio device of claim 1, wherein the controller is further configured to:
 request feedback from the user to verify that the user is speaking;
 train a logic engine to recognize that the user is speaking based on a received response to the feedback request; and
 after the training, run the logic engine to detect future instances of the user speaking for enabling recording using solely the VAD accelerometer.

8. The wearable audio device of claim 1, further comprising a memory for storing a predefined quantity of voice recording from the user,
 wherein the recording of the voice of the user is accessible via a processor to perform at least one of:
  a) analyze the voice recording for at least one of speech patterns or tone of voice, b) playback the voice recording in response to a request from the user, or c) execute virtual personal assistant (VPA) commands based on the voice recording.

9. The wearable audio device of claim 1, wherein in a second mode, the controller activates the at least one microphone to record all detectable ambient audio, wherein the controller is configured to switch from the first mode to the second mode in response to a user command.

10. The wearable audio device of claim 1, wherein the controller is further configured to enable voiceover recording of a television or streaming program using the VAD accelerometer and the at least one microphone by:
 finger printing audio output associated with the television or streaming program with the at least one microphone while recording the voice of the user with the signals from the VAD accelerometer;
 compiling the finger printed audio output with the recorded voice of the user; and
 providing the compiled finger printed audio output and recorded voice of the user for subsequent synchronized playback with the television or streaming program.

11. The wearable audio device of claim 1, further comprising a digital signal processor (DSP) coupled with the controller, wherein the controller is further configured to activate the DSP to enhance the recorded voice of the user during the recording.

12. The wearable audio device of claim 1, wherein the controller is further configured to initiate playback of the recording by at least one of:
   a) accelerating playback of the recording,
   b) playing back only select portions of the recording, or
   c) adjusting a playback speed of one or more select portions of the recording.

13. A computer-implemented method, comprising:
   at a wearable audio device comprising: a frame for contacting a head of a user; an electro-acoustic transducer within the frame and configured to output audio signals; at least one microphone; and a voice activity detection (VAD) accelerometer;
   in a first mode:
      detect that the user is speaking; and
      record a voice of the user solely with signals from the VAD accelerometer in response to detecting that the user is speaking,
      wherein recording the voice of the user solely with the signals from the VAD accelerometer excludes signals detected by the at least one microphone.

14. The method of claim 13, further comprising,
   a) in a second mode: adjusting a directionality of audio pickup from the at least one microphone to at least one of: verify that the user is speaking or enhance quality of the recording, or
   b) verifying that the user is speaking prior to initiating the recording using an input signal from an additional VAD system.

15. The method of claim 13, wherein in response to detecting that only the user is speaking, communicating with a smart device connected with the wearable audio device to initiate natural language processing (NLP) of commands in the voice of the user as detected at the at least one microphone on the wearable audio device or a microphone array on the smart device, wherein after detecting that only the user is speaking, the NLP is performed without requiring a wake word.

16. The method of claim 13, further comprising:
   requesting feedback from the user to verify that the user is speaking;
   training a logic engine to recognize that the user is speaking based on a received response to the feedback request; and
   after the training, running the logic engine to detect future instances of the user speaking for enabling recording using solely the VAD accelerometer.

17. The method of claim 13, wherein a predefined quantity of the voice recording from the user is stored at a memory, and wherein the recording of the voice of the user is accessible via a processor to perform at least one of:
   a) analyze the voice recording for at least one of speech patterns or tone of voice,
   b) playback the voice recording in response to a request from the user, or
   c) execute virtual personal assistant (VPA) commands based on the voice recording.

18. The method of claim 13, wherein method further comprises, in a second mode, activating the at least one microphone to record all detectable ambient audio, wherein switching from the first mode to the second mode is performed in response to a user command.

* * * * *